US009425878B2

(12) United States Patent
Molnar et al.

(10) Patent No.: US 9,425,878 B2
(45) Date of Patent: Aug. 23, 2016

(54) BASE STATION AND METHOD FOR SELECTING BEST TRANSMIT ANTENNA(S) FOR SIGNALING CONTROL CHANNEL INFORMATION

(71) Applicant: TELEFONAKTIEBOLAGET L M ERICSSON (PUBL), Stockholm (SE)

(72) Inventors: Karl J. Molnar, Cary, NC (US); David Astely, Bromma (SE); Tomas Sundin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 98 days.

(21) Appl. No.: 14/148,228

(22) Filed: Jan. 6, 2014

(65) Prior Publication Data
US 2014/0219190 A1    Aug. 7, 2014

Related U.S. Application Data

(63) Continuation of application No. 11/859,148, filed on Sep. 21, 2007, now abandoned, which is a continuation-in-part of application No. 11/275,388, filed on Dec. 29, 2005, now abandoned.

(51) Int. Cl.
| H04B 7/06 | (2006.01) |
| H04W 72/12 | (2009.01) |
| H04B 17/309 | (2015.01) |
| H04B 7/04 | (2006.01) |

(52) U.S. Cl.
CPC ............. *H04B 7/061* (2013.01); *H04B 7/0632* (2013.01); *H04B 7/0691* (2013.01); *H04B 17/309* (2015.01); *H04W 72/1278* (2013.01); *H04B 7/0413* (2013.01)

(58) Field of Classification Search
CPC ...................................................... H04B 7/061
See application file for complete search history.

(56) References Cited

U.S. PATENT DOCUMENTS

| 7,430,193 B2 | 9/2008 | Kim et al. |
| 2005/0128965 A1 | 6/2005 | Seo et al. |
| 2005/0219999 A1 | 10/2005 | Kim et al. |
| 2005/0220000 A1* | 10/2005 | Kim et al. ............... 370/207 |
| 2005/0250544 A1* | 11/2005 | Grant et al. ............ 455/562.1 |

(Continued)

FOREIGN PATENT DOCUMENTS

| EP | 1876727 A | 1/2008 |
| KR | 20040062266 A | 7/2004 |

(Continued)

OTHER PUBLICATIONS

S.J. Grant, J.-F. Cheng, L. Krasny, K.J. Molnar and Y.-P. Wang, "Per-Antenna-Rate-Control (PARC) in Frequency Selective Fading with SIC-GRAKE Receiver," Los Angeles, Sep. 2004.

(Continued)

*Primary Examiner* — Mazda Sabouri
(74) *Attorney, Agent, or Firm* — Patent Portfolio Builders, PLLC

(57) ABSTRACT

A base station is described herein which implements a method that uses different aspects of reported channel quality information (CQI) measurements to help select the "best" transmit antenna(s) on which to transmit control channel information to mobile terminal(s). The base station can also transmit a format indicator to communicate the assigned control channel transmit antenna(s) and the assigned data transmit antenna(s) to the mobile terminal(s).

15 Claims, 1 Drawing Sheet

(56) References Cited

U.S. PATENT DOCUMENTS

| | | | |
|---|---|---|---|
| 2006/0023745 A1* | 2/2006 | Koo et al. | 370/468 |
| 2006/0034382 A1 | 2/2006 | Ozluturk et al. | |
| 2007/0097942 A1 | 5/2007 | Gorokhov et al. | |
| 2008/0008134 A1* | 1/2008 | Satou | H04B 7/063 370/334 |
| 2008/0013638 A1 | 1/2008 | Walton et al. | |
| 2008/0260060 A1 | 10/2008 | Seo et al. | |

FOREIGN PATENT DOCUMENTS

| | | |
|---|---|---|
| KR | 20040098752 A | 11/2004 |
| WO | WO 2007/075139 A | 7/2007 |

OTHER PUBLICATIONS

S.J. Grant, J.-F. Cheng, L. Krasny, K.J. Molnar and Y.-P. Wang, "System-Level Performance Gains of Selective Per-Antenna-Rate-Control (S-PARC)," accepted for the Spring VTC, May 2005.

Juha Korhonen "Introduction to 3G Mobile Communications," Second Edition, Artech House, 2003, pp. 568.

Office Action received in CN application No. 200880107903.2 mailed Sep. 13, 2012 (English Translation).

Office Action received in EP application No. 08774493.4 mailed Aug. 23, 2010.

* cited by examiner

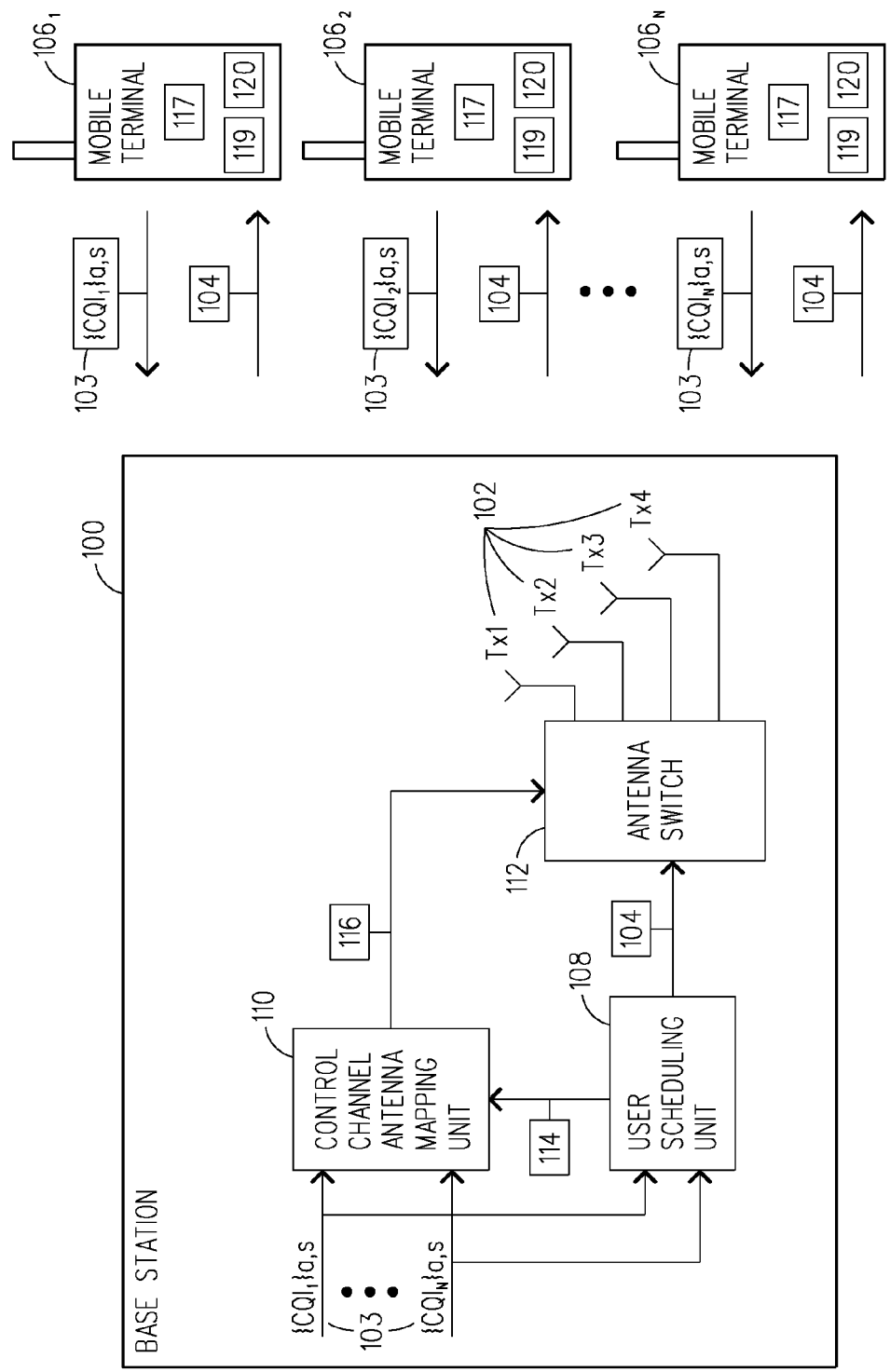

BASE STATION AND METHOD FOR SELECTING BEST TRANSMIT ANTENNA(S) FOR SIGNALING CONTROL CHANNEL INFORMATION

CROSS-REFERENCE TO RELATED APPLICATIONS

This application is a continuation of U.S. application Ser. No. 11/859,148, filed Sep. 21, 2007, pending, which is a continuation-in-part application of U.S. application Ser. No. 11/275,388, filed Dec. 29, 2005, the disclosure of which is incorporated herein by reference.

TECHNICAL FIELD

The present invention relates to the wireless communications field, and in particular, to a base station and method for selecting which transmit antenna(s) should be used to transmit control channel information to one or more receivers (mobile terminals).

BACKGROUND

The following abbreviations are herewith defined, at least some of which are referred to within the ensuing description of the prior art and the present invention.
CQI Channel Quality Information
HS-DSCH High-Speed Downlink Shared Channel
HS-SCCH High-Speed Shared Control Channel
LTE Long Term Evolution
Mbps Megabits Per Second
MCS Modulation and Coding Scheme
MIMO-SCCH Multiple Input Multiple Output Shared Control Channel
MMSE Minimum Mean-Square Estimation
OFDM Orthogonal Frequency Division Multiplexing
PARC Per-Antenna Rate Control
SNR Signal-Noise-Ratio
S-PARC Selective Per-Antenna Rate Control
SIC Successive Interference Cancellation
TTI Total Timeslot Interval
WCDMA Wideband CDMA In the multi-antenna concept proposed for the HSDPA mode of a WCDMA cellular system, the selection of a subset of antennas by the base station from which to transmit data streams to mobile terminals is considered an extension of fast link adaptation for single-antenna systems. This multi-antenna approach leads to a transmission antenna mode that is closely matched to the existing propagation conditions between the base station and mobile terminals. In one case, the base station can utilize PARC which is a multi-antenna approach that provides high downlink data rates to mobile terminals (see, S. J. Grant et al. "Per-Antenna-Rate-Control (PARC) in Frequency Selective Fading with SIC-GRAKE Receiver" Los Angeles, September 2004). In this approach, the base station uses separate transmission rates for the data streams which are mapped to all of the transmit antennas. In another case, the base station can utilize S-PARC which is a multi-antenna approach that provides even higher downlink data rates to the mobile terminals (see, S. J. Grant et al. "System-Level Performance Gains of Selective Per-Antenna-Rate-Control (S-PARC)" published in the IEEE Spring Vehicular Technology Conference, May 2005). In this approach, the base station selectively adapts both the transmit antenna(s) and the transmission data rates which are to be used to transmit the data streams to the mobile terminals.

As part of the fast link adaptation process, the mobile terminals measure the CQI and transmit the CQI measurements on the uplink to the base station so that the base station can use the CQI measurements to select the transmission data rate assignment and if needed the transmit antenna(s) assignment. Since the base station transmits signals concurrently from different transmit antennas these signals interfere with each other which means the estimated CQI is going to change for each combination of transmit antennas. Thus, the providing of CQI estimates for each transmit antenna under each combination of transmit antenna(s) is going to utilize a large amount of the available uplink resources when compared to single-antenna transmission. Moreover, the type of receivers employed in the mobile terminals may increase the number of CQI values that may be fed back on the uplink to the base station. For example, the mobile terminal may have a SIC receiver which places an ordering on the transmit antenna(s) so that there will be a separate CQI value for each permutation (rather than combination) of the transmit antenna(s).

One approach that can be used to reduce the complexity of the CQI feedback from a mobile terminal that uses a SIC receiver and implements S-PARC was described in co-assigned U.S. patent application Ser. No. 10/841,911 filed on May 7, 2004 and entitled "Reduced CQI Feedback for MIMO HSDPA" (the contents of which are hereby incorporated by reference herein). In this approach, the base station that is considering transmission with one antenna will select the transmit antenna that provides the best rate and use that for a single-antenna transmission. In considering transmission with two antennas, the base station constrains the two-antenna subset to contain the best antenna previously found for the single-antenna transmission and the transmit antenna with the next-best rate. This scheme is repeated for the three-antenna subset, the four-antenna subset etc. . . . , and in general is called the "subset property" when related to the transmit antenna selection. Thus, an order is given to the transmit antennas so that the first antenna has the greatest transmit rate while the last antenna has the lowest transmit rate. This ordering of antennas from lowest to greatest rates is the order that the SIC-receiver processes the received signals. As a result, a large number of antenna orderings can be avoided and the feedback on the uplink can be reduced by constraining the antenna order and antenna subset selection by using a CQI report with this subset property.

Moreover, if the base station acquires the CQI report based on the subset property then it can use this scheme to help determine the set of antennas which are to be used for transmission. Thereafter, the base station signals to the mobile terminal the number of antennas used for transmission and the transport formats for the transmitted streams. Since, both the base station and the mobile terminal know the ordering contained as part of the CQI report, the actual transmit antennas used for the transmission could be determined by the mobile terminal. This notion of antenna ordering can also be used with mobile terminals/receivers that do not require an ordered set of antennas for detection. In this situation, the antenna ordering is used solely for providing an efficient CQI reporting technique and allows the base station to select the number of transmit antennas and the corresponding rates for subsequent transmissions.

In WCDMA, release 5, the base station can use four HS-SCCHs and different channelization codes to transmit the transport information to as many as four different mobile terminals during a single TTI. While, the co-pending U.S. patent application Ser. No. 11/275,388 introduced a MIMO shared control channel (MIMO-SCCH) which the base station could use to signal the transport information to a mobile terminal that is capable of receiving a multi-stream transmission. In the HSDPA mode, the base station reliably transmits the HS-SCCHs and MIMO-SCCH by using a spreading code of 128 to ensure the strength of the despread signal. In addition, the base station can place the HS-SCCHs and MIMO-SCCH on the best transmit antenna to help improve the SNR of these control channels. However, in a LTE mode which is based on OFDM there is no such spreading code which can be used to boost the signal level of one antenna relative to the other transmit antennas (note: WiMAX and 4G systems are other types of OFDM systems). Thus, to help ensure the reliable transmission of the shared control channel and information thereon from one antenna to the mobile terminal(s), the base station could use a couple of different approaches as follows:

- For those OFDM symbols corresponding to the shared control channel, allow no other antenna to transmit at the same symbol positions. This, of course, denies use of the same OFDM tiles for the transmission of data.
- The information on the shared control channel can be encoded using a stronger code rate to overcome interference from the other transmit antennas. However, this may not be the most effective approach since the control channel already has strong coding and this coding would be used to overcome interference that has been self-generated.
- Use interference cancellation techniques at the mobile terminal to cancel the interfering signals from the other transmit antennas. However, to cancel the self-interference generated by multiple transmit antennas, the mobile terminal has to know which antennas are used for data transmission and for the control channel so the appropriate quantities (e.g. impairment covariance matrix) can be constructed at the receiver.
- Transmit the control channel on the "best" antenna. In the co-pending U.S. patent application Ser. No. 11/275,388, the best antenna is the one with the highest SNR as reported within the CQI measurements. However, when there are multiple CQI measurements reported, for example, over different sub-bands in an OFDM system, then this notion of best antenna is ambiguous. Also, in co-pending U.S. patent application Ser. No. 11/275,388, the SNR associated with an antenna may be related to the order the antennas are detected because it is generally desired to have control channels detected prior to the data channels.

Thus, while it is clear that using the best transmit antenna to advantageously transmit the control channel should be performed, the decision about which antenna is best and the signaling required to support this transmission needs further consideration. These particular needs and other needs are satisfied by the base station and method of the present invention.

SUMMARY

In one aspect, the present invention provides a base station that includes: (a) a user scheduling unit that receives channel quality information measurements (from a mobile terminal) and outputs user scheduling information and control channel information; (b) a control channel antenna mapping unit that receives the channel quality information measurements (from the mobile terminal) and the user scheduling information and processes the channel quality information measurements and the user scheduling information to select which transmit antenna(s) should be used to transmit the control channel information; and (c) an antenna switch that receives a transmit antenna selection from the control channel antenna mapping unit and the control channel information from the user scheduling unit and then uses the selected transmit antenna(s) to transmit the control channel information.

In yet another aspect, the present invention provides a method for selecting one or more transmit antennas from which to transmit control channel information to one or more receivers. The method includes the steps of: (a) receiving channel quality information measurements from the one or more receivers; and (b) analyzing the received channel quality information measurements to select which transmit antenna(s) to use for transmitting the control channel information to the one or more receivers.

In still yet another aspect, the present invention provides a receiver (mobile terminal) that includes: (a) a receiving unit that receives a format indicator from a base station; and (b) a processor that processes the format indicator to determine which transmit antenna(s) in the base station are going to transmit control data channel information and which transmit antenna(s) in the base station are going to transmit data information.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawing:

FIG. 1 is a block diagram which is used to help explain how a base station can take into account CQI measurements reported from one or more mobile terminal(s) and determine which transmit antenna(s) to use to transmit control channel information to the one or more mobile terminal(s) in accordance with the present invention.

DETAILED DESCRIPTION

Referring to FIG. 1, there is shown a block diagram that is used to help explain how a base station 100 can take into account various aspects of CQI measurements 103 received from one or more mobile terminal(s) 106 to select which transmit antenna(s) 102 should be used to transmit control channel information 104 (via the MIMO-SCCH) to the one or more mobile terminal(s) 106 in accordance with the present invention. The base station 100 includes a user scheduling unit 108, a control channel antenna mapping unit 110 and an antenna switch 112 (note: only the components within the base station 100 that are needed to help explain the present solution have been discussed and illustrated herein). As shown, the user scheduling unit 108 and the control channel antenna mapping unit 110 both receive CQI measurements 103 from the mobile terminal(s) 106. In this example, each CQI measurement 103 contains the channel quality values for each transmit antenna 102 and each sub-band in the downlink signal received by the corresponding mobile terminal 106. Upon receiving the CQI measurements 103, the user scheduling unit 108 processes this information and outputs user scheduling information 114 and control channel information 104. The control channel antenna mapping unit 110 receives the CQI measurements 103 and the user scheduling information 114 and then processes this information to select which transmit antenna(s) 102 should be used to transmit the control channel information 104 to the mobile terminal(s) 106. Then, the control channel antenna mapping unit 110 outputs a transmit antenna selection 116 to the antenna switch 112. The antenna switch 112 receives the transmit antenna selection 116 from the control channel antenna mapping unit 110 and the control channel information 104 from the user scheduling unit 110 and then uses the selected transmit antenna(s) 102 to transmit the control channel information 104 to the mobile terminal(s) 106 (note: each mobile terminal 106 can receive control channel information 104 from different transmit antenna(s) 102).

A detailed discussion about several different cases is provided below to explain different ways the base station 100 can select the "best" transmit antenna(s) 102 on which to assign the control channel information 104 based on various assumptions regarding the CQI feedback 103 which is received from the mobile terminal(s) 106. While these different cases are discussed, it should be noted that the first consideration should be whether the mobile terminal 106 (receiver) assumes some implicit or explicit ordering of the transmit antennas 102 and if there is ordering then the antenna order is defined in a manner where signals assigned to the selected antennas can be detected. In this case, it is desired to place the control channel on the antennas first detected. If, the mobile terminal 106 (receiver) does not require an antenna detection order, even though the CQI reports may be ordered for other purposes such as antenna selection, then it is still desirable to place the control channel on the selected antenna 102 with the best CQI value. Plus, in the discussion below, it is assumed that signals are mapped directly to transmit antennas 102. However, the mapping between signals and antennas 102 may not need to be mapped in such a direct manner which in effect creates a set of virtual antennas (e.g. fixed beamforming is one mapping that forms a set of virtual antennas). As such, the present invention also applies to the case of indirect mapping (i.e. virtual antennas) as well as the direct mapping of signals to antennas.

In the first case, assume the CQI reports 103 have values that are ordered and that the mobile terminals 106 (receivers) use this antenna detection order. In this case, the CQI reports 103 may use the subset property discussed above to reduce the amount of feedback required in the uplink signaling. As discussed above, the mobile terminal(s) 106 may submit ordered CQI reports 103 because they have a SIC receiver 117. A simple example of an ordered CQI report 103 for a 4-antenna S-PARC is illustrated in TABLE 1.

TABLE 1

| Antenna | MCS Rate (Mbps) |
| --- | --- |
| A | 4 |
| B | 2 |
| C | 1 |
| D | 0.05 |

TABLE 1 describes the set of antennas and the transmit rates that the base station 100 can use for transmitting information to a mobile terminal 106 in the following manner: for single-antenna transmission then antenna A can be used with a transmit rate of 4 Mbps; two-antenna transmission uses antennas A and B with up to 6 Mbps; three antenna transmission uses antennas A, B, and C with a rate of 7 Mbps; and transmission with all four antennas A, B, C and D has a maximum rate of 7.05 Mbps (note: the reported CQI values may be some metric other than rate (e.g. SNR levels) and if this is the case then the rates could be derived from these metrics). When the mobile terminal 106 uses SIC reception then the antenna with the lowest rate is detected first where its signal is decoded, re-encoded and subtracted from the composite received signal before detecting the signal for the antenna with the next highest rate.

Thus, for single-antenna transmission, the base station 100 should use antenna A for the shared control channel. Clearly, this is more efficient than if the base station 100 placed the control channel on antenna D. Next, consider when the base station 100 would use two transmit antennas A and B for data transmission. Antenna A obtains its high rate since the signal from antenna B is subtracted from the composite signal as part of the SIC process in the mobile terminal 106. Therefore, it is preferable that the base station 100 place the control channel signal on the first detected antenna, namely antenna B. For three-antenna transmission, the base station 100 would place the control channel signal on antenna C. Finally, for four-antenna transmission, the base station 100 would place the control channel signal on antenna D. Since, the number of transmit antennas 102 and the antenna detection order is known to the mobile terminal 106, the first detected antenna which contains the control channel information 104 can be determined with little additional signaling. In a situation where there is no antenna detection ordering, then the base station 100 would determine the best antenna to be the selected antenna with the highest rate. This would be used even if the CQI report 103 is ordered for some other purpose, such as for reducing the amount of information that would need to be contained in the CQI report 103.

A second case arises when the mobile terminals 106 report multiple CQI values for each transmit antenna 102, for example, in an OFDM system the mobile terminals 106 would report CQI values 103 for each of the different sub-bands of the entire signal bandwidth (see FIG. 1). In the following examples, consider an OFDM system with four sub-bands and four transmitted streams (one per antenna A, B, C and D). In this situation, a complete CQI report 103 has four CQI rate values reported for each sub-band for each antenna A, B, C and D. This exemplary CQI report 103 is shown in TABLE 2.

TABLE 2

| Antenna | Sub-band 1 (Mbps) | Sub-band 2 (Mbps) | Sub-band 3 (Mbps) | Sub-band 4 (Mbps) |
| --- | --- | --- | --- | --- |
| A | 1 | 3 | 2 | 3 |
| B | 2 | 1 | 3 | 4 |
| C | 4 | 2 | 1 | 2 |
| D | 3 | 4 | 4 | 1 |

Note:
this exemplary CQI report 103 is used several times hereinafter to help explain different aspects of the present solution.

In TABLE 2, the mobile terminals 106 report the CQI measurements 103 for the four antennas A, B, C and D for each sub-band within the bandwidth of a received signal. Now, the base station 100 needs to decide which antenna(s) A, B, C, or D should be assigned to transmit the control channel information 104 to the mobile terminals 106. A number of different possibilities exist and depend on factors such as: (1) the assignment of mobile terminal(s) 106 to the different sub-bands; (2) the antenna selection for each mobile terminal 106; and (3) the nature of the CQI report 103. Some exemplary options are discussed in detail below:

A. The base station 100 can specify an antenna assignment for the control channel information 104 for each sub-band in the signal bandwidth depending on the antenna selection for data transmission in each sub-band of the signal to the mobile terminals 106. In the above example, there would be four control channel antenna assignments, one for each sub-band. As an example, if only one antenna is selected for transmission in each sub-band, then the antenna with the highest rate (those with the superscript[1] in TABLE 3) for each sub-band could be used for transmitting the control channel information 104 to the mobile terminals 106. If two antennas are selected in each sub-band, and a receiver-dependent antenna order is specified for each sub-band, then the antennas with the second highest rate (those with the superscript[2] in TABLE 3) for each sub-band could be used for transmitting the control channel information 104 to the mobile terminals 106.

TABLE 3

| Antenna | Sub-band 1 (Mbps) | Sub-band 2 (Mbps) | Sub-band 3 (Mbps) | Sub-band 4 (Mbps) |
|---|---|---|---|---|
| A | 1 | $3^2$ | 2 | $3^2$ |
| B | 2 | 1 | $3^2$ | $4^1$ |
| C | $4^1$ | 2 | 1 | 2 |
| D | $3^2$ | $4^1$ | $4^1$ | 1 |

B. If the control channel is user-specific, meaning one separately encoded control channel is assigned to each mobile terminal 106, then the base station 100 could make the control channel antenna assignment on a specific basis for each specific mobile terminal 106. In this case, the base station 100 could make the control channel antenna assignment as follows:

1. The base station 100 can restrict the control channel antenna assignment to the specific mobile terminal 106 to be one of the antennas that had been selected for data transmission that is in the sub-band(s) assigned to that user. For example, assume there are two mobile terminals 106 where the base station 100 assigns one mobile terminal 106 to sub-bands 2, 3 and 4 and uses antennas B and D to transmit the control channel (see superscript[1] in TABLE 4). Furthermore, the base station 100 assigns the other mobile terminal 106 to the sub-band 1 and uses antenna C to transmit the control channel (see superscript[2] in TABLE 4).

TABLE 4

| Antenna | Sub-band 1 (Mbps) | Sub-band 2 (Mbps) | Sub-band 3 (Mbps) | Sub-band 4 (Mbps) |
|---|---|---|---|---|
| A | 1 | 3 | 2 | 3 |
| B | 2 | 1 | 3 | $4^1$ |
| C | $4^2$ | 2 | 1 | 2 |
| D | 3 | $4^1$ | $4^1$ | 1 |

2. In addition to 1), the base station 100 can use the sum rate over the sub-bands assigned for the user's data transmission when determining which antenna to assign the control channel information 104. In this case, the base station 100 rather than assign antennas per sub-band, would assign only one antenna to be used for the control channel across all of the assigned sub-bands. Assuming a single antenna is used for data transmission, the base station 100 could choose the antenna with the highest sum data rate from which to send the control channel for each mobile terminal 106. In the same example above, the base station 100 would assign one mobile terminal 106 to sub-bands 2, 3 and 4 and use antenna D to transmit the control channel (see superscript[1] in TABLE 5). And, the base station 100 would assign the other mobile terminal 106 to sub-band 1 and use antenna C to transmit the control channel (see superscript[2] in TABLE 5).

TABLE 5

| Antenna | Sub-band 1 (Mbps) | Sub-band 2 (Mbps) | Sub-band 3 (Mbps) | Sub-band 4 (Mbps) |
|---|---|---|---|---|
| A | 1 | 3 | 2 | 3 |
| B | 2 | 1 | 3 | 4 |
| C | $4^2$ | 2 | 1 | 2 |
| D | 3 | $4^1$ | $4^1$ | $1^1$ |

3. In addition to 1), the base station 100 can use the sum rate over a set of select sub-bands to determine which antenna to assign the control channel information 104 to each mobile terminal 106 (note: in this particular case the control channel would be transmitted only in certain sub-bands). Using the same example above except only the odd-numbered sub-bands are used, the base station 100 would assign one mobile terminal 106 to sub-band 3 and use antenna D to transmit the control channel (see superscript[1] in TABLE 6). And, the base station 100 would assign the other mobile terminal 106 to the sub-band 1 and use antenna C to transmit the control channel (see superscript[2] in TABLE 6).

TABLE 6

| Antenna | Sub-band 1 (Mbps) | Sub-band 2 (Mbps) | Sub-band 3 (Mbps) | Sub-band 4 (Mbps) |
|---|---|---|---|---|
| A | 1 | 3 | 2 | 3 |
| B | 2 | 1 | 3 | 4 |
| C | $4^2$ | 2 | 1 | 2 |
| D | 3 | 4 | $4^1$ | 1 |

4. In addition to 1), the base station 100 can after computing the rate for each antenna, assign the control channel to the first detected antenna in the case where there is a receiver-dependent detection order specified by the respective mobile terminal 106. TABLE 7 shows an example where two antennas are used for data transmission in each sub-band and the sum rates are computed for the mobile terminal 106 assigned to sub-bands 2-4 (using antennas A and D), and a second mobile terminal 106 assigned to sub-band 1 (using antennas C and D). After computing the sum rates, the base station 100 would transmit the control channel information 104 on the first detected antenna A in sub-bands 2-4 (see superscript) and on the first detected antenna D in sub-band 1 (see superscript[2]).

TABLE 7

| Antenna | Sub-band 1 (Mbps) | Sub-band 2 (Mbps) | Sub-band 3 (Mbps) | Sub-band 4 (Mbps) |
|---|---|---|---|---|
| A | 1 | $3^1$ | $2^1$ | $3^1$ |
| B | 2 | 1 | 3 | 4 |
| C | 4 | 2 | 1 | 2 |
| D | $3^2$ | 4 | 4 | 1 |

In the situation, where the base station 100 transmits one control channel that is shared among multiple mobile terminals 106, then the above techniques could be used, however, the antenna selection could also be made to satisfy the most disadvantaged mobile terminal 106 out of all of the mobile terminals 106 designated for data transmission. For example, consider the case associated with TABLE 4, where one mobile terminal 106 is assigned to three sub-bands 2, 3 and 4 while the other mobile terminal 106 is assigned to only one sub-band 1. If the coding is accounted for, then the mobile terminal 106 with the fewest possible bits to code across would be disadvantaged with respect to the other mobile terminal 106 that has more bits available for coding. Thus, the disadvantaged mobile terminal 106 would be the one that was assigned to sub-band 1 and as a result the base station 100 would assign the control channel according to this particular mobile terminal. Of course, the base station 100 should give some consideration that the other mobile terminal 106 would not become even more disadvantaged under this particular assignment.

In another aspect of the present solution, the base station 100 should have a way to signal the control channel antenna assignment as well as which antennas were selected for data transmission to the mobile terminal(s) 106. In the scenario, when the base station 100 selects the transmitted antennas based on antenna detection ordered CQI measurements 103, and the control channel is placed on the first detected antenna according to that antenna detection ordering, then all that is required for the base station 100 to signal in the downlink is the number of transmitted streams, since the ordering is already known at the corresponding mobile terminal 106. Of course, if the mobile terminal 106 can not derive the ordering, then the base station 100 would need to signal this ordering to the mobile terminal 106. In another scenario, if there is no such explicit or implicit ordering, then there is ambiguity in which antennas are used by the base station 100 for data transmission and control channel transmission to the mobile terminal 106 and as a result the base station 100 needs to signal this information to the corresponding mobile terminal 106.

If the control channel and data channel antenna assignments are required to be signaled, then the base station 100 can signal these two quantities together for a given transmission scheme to the mobile terminal 106. For example, for a 4-antenna PARC transmission scheme and when there is no assumed antenna detection ordering at the mobile terminal 106 (e.g. when an MMSE receiver 117 is used), the base station 100 can signal a format indicator to the mobile terminal 106 which is based on the following

TABLE 8

| Transmission Format Indicator | Transmission Type | Antenna Mapping |
|---|---|---|
| 1 | PARC1a | {1} |
| 2 | PARC1b | {2} |
| 3 | PARC1c | {3} |
| 4 | PARC1d | {4} |
| 5 | PARC2a | {1, 2} |
| 6 | PARC2b | {1, 3} |
| 7 | PARC2c | {1, 4} |
| 8 | PARC2d | {2, 1} |
| 9 | PARC2e | {2, 3} |
| 10 | PARC2f | {2, 4} |
| 11 | PARC2g | {3, 1} |
| 12 | PARC2h | {3, 2} |
| 13 | PARC2i | {3, 4} |
| 14 | PARC2j | {4, 1} |
| 15 | PARC2k | {4, 2} |
| 16 | PARC2l | {4, 3} |
| 17 | PARC3a | {1, 2, 3} |
| 18 | PARC3b | {1, 2, 4} |
| 19 | PARC3c | {1, 3, 4} |
| 20 | PARC3d | {2, 1, 3} |
| 21 | PARC3e | {2, 1, 4} |
| 22 | PARC3f | {2, 3, 4} |
| 23 | PARC3g | {3, 1, 2} |
| 24 | PARC3h | {3, 1, 4} |
| 25 | PARC3i | {3, 2, 4} |
| 26 | PARC3j | {4, 1, 2} |
| 27 | PARC3k | {4, 1, 3} |
| 28 | PARC3l | {4, 2, 3} |
| 29 | PARC4a | {1, 2, 3, 4} |
| 30 | PARC4b | {2, 1, 3, 4} |
| 31 | PARC4c | {3, 1, 2, 4} |
| 32 | PARC4d | {4, 1, 2, 3} |

Note 1:
the base station 100 would signal a transmission format indicator and the mobile terminal 106 would then convert that into a predefined antenna mapping indicator to determine the control channel and data channel antenna assignments).

Note 2:
the mobile terminal 106 would have a receiving unit 117 that receives the format indicator from the base station 100 and a processor 119 which accesses and processes instructions that are stored in memory 120 to process the format indicator and to determine which transmit antenna(s) in the base station 100 are going to be used to transmit control data channel information and which are going to be used to transmit data information.

In this scheme, the first antenna listed for each format type specifies the antenna used for the control channel. Thus, this base station 100 can use 5 bits to specify the combined control channel antenna assignment and the data antenna assignment since the control channel antenna is going to be one of the data channel antennas. In the above table, each entry except for those entries with one transmit antenna, represents a partial ordering of the selected transmit antennas. This occurs because the first detected antenna is designated as the antenna used for the control channel, however, the remaining antennas can be specified in any order since the mobile terminal 106 does not rely on such antenna detection ordering for the detection of the remaining transmitted streams. In any case, a lower signaling overhead can be achieved by using such an approach.

If desired, this table could further be re-arranged in the manner shown in TABLE 9:

TABLE 9

| Transmission Format Indicator | Transmission Type | Antenna Mapping |
|---|---|---|
| 1 | PARC1a | {1} |
| 2 | PARC2a | {1, 2} |
| 3 | PARC2b | {1, 3} |
| 4 | PARC2c | {1, 4} |
| 5 | PARC3a | {1, 2, 3} |
| 6 | PARC3b | {1, 2, 4} |
| 7 | PARC3c | {1, 3, 4} |
| 8 | PARC4a | {1, 2, 3, 4} |
| 9 | PARC1b | {2} |
| 10 | PARC2d | {2, 1} |
| 11 | PARC2e | {2, 3} |
| 12 | PARC2f | {2, 4} |
| 13 | PARC3d | {2, 1, 3} |
| 14 | PARC3e | {2, 1, 4} |
| 15 | PARC3f | {2, 3, 4} |
| 16 | PARC4b | {2, 1, 3, 4} |
| 17 | PARC1c | {3} |
| 18 | PARC2g | {3, 1} |
| 19 | PARC2h | {3, 2} |
| 20 | PARC2i | {3, 4} |
| 21 | PARC3g | {3, 1, 2} |
| 22 | PARC3h | {3, 1, 4} |
| 23 | PARC3i | {3, 2, 4} |
| 24 | PARC4c | {3, 1, 2, 4} |
| 25 | PARC1d | {4} |
| 26 | PARC2j | {4, 1} |
| 27 | PARC2k | {4, 2} |
| 28 | PARC2l | {4, 3} |
| 29 | PARC3j | {4, 1, 2} |

TABLE 9-continued

| Transmission Format Indicator | Transmission Type | Antenna Mapping |
|---|---|---|
| 30 | PARC3k | {4, 1, 3} |
| 31 | PARC3l | {4, 2, 3} |
| 32 | PARC4d | {4, 1, 2, 3} |

In the re-arranged TABLE 9, it can be see that there are 8 entries for each assignment of the control channel information (the first antenna in the antenna mapping) which could be easily captured into two of the five designated bits. This format scheme allows for a partitioning of the signaling bits into two classes of bits, where two bits are used to specify the control (and data) channel antenna selection and three bits are used to indicate any additional data transmission antennas. In particular, two bits are used to specify the control channel antenna (e.g., assign antenna 1 through antenna 4 to bits {0,0} through bits {1,1}) and these can be transmitted separately from the remaining bits (e.g., via a broadcast transmission). The remaining three bits can be assigned to binary values {0,0,0} to {1,1,1}. For example, in this scheme for each control antenna assignment, there are 0, 1, 2, or 3 additional antennas which may be assigned for data transmission. So, if antenna 4 is assigned to the control (and data) channel, and no additional data antenna is assigned then the base station 100 would use the transmission format indicator 25 in TABLE 9. If antenna 1 is assigned additionally for data transmission, then the base station 100 would use the transmission format indicator 26 in TABLE 9, and so on. If desired, this partitioning may be used to broadcast the bits corresponding to the control channel antenna selection, while the additional bits used for the data channel would be transmitted as part of the downlink signaling to the corresponding mobile terminal 106. If the antenna selection for the control channel does not change as rapidly as the antenna selection for the data transmission, then some amount of signaling overhead may be saved when the base station 100 and mobile terminals 106 utilize this particular approach.

From the foregoing, it can be appreciated that the basic concept of the present solution is to enable the base station 100 to use different aspects of the reported CQI measurements 103 to select the "best" antenna(s) on which to transmit control channel information 104 to the mobile terminal(s) 106. For example, in one aspect a mobile terminal 106 with a receiver 117 may report a CQI measurement 103 that has a specific antenna detection ordering associated with it, in which case the base station 100 could place the control channel on the first detected antenna. A second aspect may be in a system such as OFDM, where there are multiple CQI values reported for each antenna over the bandwidth of the OFDM signal and, consequently, the base station 100 can use sum rates to help determine which antenna is the best to place the control channel. Another aspect is the case where there is data to be transmitted to more then one mobile terminal 106, then the best antenna 100 can select the "best" antenna(s) in view of the frequency assignment and antenna selection for each scheduled mobile terminal 106. Lastly, in another aspect, the base station 100 can use a specific signal format indication to signal the selected control channel antenna and the data antenna(s) to the mobile terminal 106.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A method for selecting one or more transmit antennas from which to transmit control channel information to one or more receivers, said method comprising the steps of:
   receiving channel quality information measurements from the one or more receivers, wherein said channel quality information measurements are a function of the channel quality of downlink data channels; and,
   analyzing the received channel quality information measurements to select which transmit antenna(s) to be used to transmit the control channel information independently from which antenna(s) are selected for data transmission,
   wherein when said received channel quality information measurements have a specific antenna detection ordering then said analyzing step results in selecting the transmit antenna(s) which are going to be detected first by the one or more receivers.

2. The method of claim 1, further comprising the step of transmitting a format indicator to the one or more receivers where the format indicator identifies the transmit antenna assignments for both data information and the control channel information.

3. The method of claim 1, wherein when said received channel quality information measurements have a value for each sub-band within a signal bandwidth for each transmit antenna then said analyzing step includes a step of restricting the selection of possible transmit antenna(s) that could be used to transmit the control channel information to be from a group of transmit antenna(s) which had been selected to transmit data to the one or more receivers.

4. The method of claim 3, wherein said restricting step further includes a step of using a sum data rate over each sub-band within the signal bandwidth for each transmit antenna that is used for data transmission when determining the transmit antenna(s) which are to be used to transmit the control channel information to the one or more receivers.

5. The method of claim 3, wherein said restricting step further includes a step of restricting the sub-band(s) within the signal bandwidth for each transmit antenna that could be used to transmit the control channel information to the one or more receivers.

6. The method of claim 1, wherein when said received channel quality information measurements have a specific antenna detection ordering and a value corresponding to each sub-band within a signal bandwidth for each transmit antenna then said analyzing step includes a step of computing a sum data rate for each potential transmit antenna and a step of assigning the control channel information to the transmit antenna(s) which are going to be detected first by the one or more receivers.

7. The method of claim 1, wherein when the control channel information is transmitted to multiple receivers then said analyzing step includes a step of selecting the transmit antenna(s) which satisfy the most disadvantaged receiver of the multiple receivers.

8. The method of claim 1, further comprising a step of transmitting a format indicator to the one or more receivers where the format indicator identifies a first transmit antenna assignment for the control channel information and a first detected transmit antenna of the data channel and a second transmit antenna assignment for the remaining detected antennas of the data channel.

9. The method of claim 8, further comprising the step of transmitting the portion of the format indicator that identifies a first transmit antenna assignment for the control channel information and the first detected transmit antenna to the one or more receivers on a first transmission and transmitting the portion of the format indicator that identifies the second transmit antenna assignment for the remaining detected antennas of the data channel on a second transmission to the one or more receivers.

10. A base station comprising:
- a user scheduling unit that receives channel quality information measurements and outputs user scheduling information and control channel information, wherein said channel quality information measurements are a function of the channel quality of downlink data channels;
- a control channel antenna mapping unit that receives the channel quality information measurements and the user scheduling information and processes the channel quality information measurements and the user scheduling information to select which transmit antenna(s) to be used to transmit the control channel information independently from which antenna(s) are selected for data transmission; and,
- an antenna switch that receives a transmit antenna selection from said control channel antenna mapping unit and the control channel information from said user scheduling unit and then uses the selected transmit antenna(s) to transmit the control channel information;
- wherein when said received channel quality information measurements have a specific antenna detection ordering then said control channel antenna mapping unit selects the transmit antenna which is first detected by a receiver.

11. The base station of claim 10, wherein said control channel antenna mapping unit specifies a format indicator to indicate transmit antenna assignments for both data information and the control channel information.

12. The base station of claim 10, wherein when said received channel quality information measurements have no specific ordering then said control channel antenna mapping unit selects the transmit antenna(s) which have a highest individual data rate(s) from a group of transmit antenna(s) that had been selected to transmit data to a receiver.

13. The base station of claim 12, wherein when said received channel quality information measurements have no specific ordering then said control channel antenna mapping unit selects the transmit antenna(s) which have a highest sum data rate(s) from a group of transmit antenna(s) that had been selected to transmit data to a receiver.

14. The base station of claim 10, wherein when the control channel information is transmitted to multiple receivers then said control channel antenna mapping unit selects the transmit antenna(s) which satisfy the most disadvantaged receiver of the multiple receivers.

15. The base station of claim 10, wherein said user scheduling unit, said control channel antenna mapping unit and said antenna switch are part of an orthogonal frequency division multiplexing system.

\* \* \* \* \*